(12) United States Patent
Lee (10) Patent No.: US 7,634,834 B2
(45) Date of Patent: Dec. 22, 2009

(54) WINDSHIELD WIPER ASSEMBLY HAVING A BODY MADE OF SPRING STEEL

(75) Inventor: Albert Lee, Baltimore, MD (US)

(73) Assignee: Alberee Products, Inc., Baltimore, MD (US)

( * ) Notice: Subject to any disclaimer, the term of this patent is extended or adjusted under 35 U.S.C. 154(b) by 426 days.

(21) Appl. No.: 11/228,334

(22) Filed: Sep. 19, 2005

(65) Prior Publication Data

US 2007/0061993 A1    Mar. 22, 2007

(51) Int. Cl.
*B60S 1/38* (2006.01)
(52) U.S. Cl. .......................... 15/250.43; 15/250.451; 15/250.452; 15/250.453
(58) Field of Classification Search ............. 15/250.43, 15/250.44, 250.451–250.454
See application file for complete search history.

(56) References Cited

U.S. PATENT DOCUMENTS

| | | | | |
|---|---|---|---|---|
| 2,782,442 | A * | 2/1957 | Krohm | 15/250.452 |
| 2,983,945 | A * | 5/1961 | De Pew | 15/250.452 |
| 3,418,679 | A | 12/1968 | Barth et al. | |
| D213,100 | S | 1/1969 | Rickett | |
| 3,428,997 | A | 2/1969 | Rickett | |
| 3,566,432 | A | 3/1971 | Quinlan et al. | |
| 3,626,544 | A * | 12/1971 | Lopez et al. | 15/250.361 |
| 3,707,741 | A * | 1/1973 | Roberts | 15/250.452 |
| 3,808,630 | A | 5/1974 | Ito | |
| 3,823,437 | A * | 7/1974 | Hauke | 15/250.452 |
| 4,722,112 | A | 2/1988 | Schaub et al. | |
| 5,392,489 | A | 2/1995 | Mohnach | |
| 6,308,373 | B1 | 10/2001 | Merkel et al. | |
| 6,523,218 | B1 | 2/2003 | Kotlarski et al. | |
| 6,668,419 | B1 | 12/2003 | Kotlarski | |
| 6,671,922 | B1 | 1/2004 | Geilenkirchen et al. | |
| 7,007,339 | B2 | 3/2006 | Weiler et al. | |
| 2002/0148063 | A1 * | 10/2002 | De Block et al. | 15/250.43 |
| 2003/0145412 | A1 * | 8/2003 | Weiler et al. | 15/250.201 |
| 2003/0159229 | A1 | 8/2003 | Weiler et al. | |
| 2004/0181894 | A1 | 9/2004 | Lee et al. | |
| 2005/0172443 | A1 | 8/2005 | Genet et al. | |
| 2006/0037167 | A1 | 2/2006 | Nacamuli | |
| 2006/0156529 | A1 | 7/2006 | Thomar et al. | |

FOREIGN PATENT DOCUMENTS

| | | | |
|---|---|---|---|
| DE | 10000372 | * | 8/2001 |
| DE | 100 14 803 A1 | | 10/2001 |
| DE | 101 11 757 A1 | | 9/2002 |
| DE | 103 35 393 A1 | | 9/2004 |
| DE | 202004012109 | * | 9/2004 |
| GB | 2 106 775 A | | 4/1983 |

\* cited by examiner

*Primary Examiner*—Gary K Graham
(74) *Attorney, Agent, or Firm*—Birch, Stewart, Kolasch & Birch, LLP (57) ABSTRACT

A windshield wiper assembly includes a pair of leaf spring elements. The leaf spring elements are supported generally parallel to each other with a space therebetween. A squeegee is supported within the space between the leaf spring elements. A windshield wiper arm bracket is fixed to an intermediate portion of the pair of spring steel elements and is connectable to a windshield wiper arm. A support bracket maintains the pair of leaf spring elements in generally parallel spaced apart relation to support said squeegee therebetween. The support bracket supports the squeegee for longitudinal movement with respect to the pair of leaf spring elements during operation of the windshield wiper assembly to prevent binding of the squeegee.

14 Claims, 5 Drawing Sheets

WINDSHIELD WIPER ASSEMBLY HAVING A BODY MADE OF SPRING STEEL

BACKGROUND OF THE INVENTION

1. Field of the Invention

The present invention relates to a windshield wiper assembly having a body made of spring steel. In particular, the present invention is directed to a windshield wiper assembly having a body made of spring steel that includes a bracket to secure a squeegee to the spring steel.

2. Description of Related Art

Various types of windshield wiper assemblies having a body made of spring steel are known. For example, one windshield wiper assembly uses two parallel pieces of spring steel to secure a squeegee therebetween. The two pieces of spring steel are spot welded together in spaced apart relationship with a portion of the squeegee being located between the two pieces of spring steel. Although this background art windshield wiper assembly eliminates the necessity of having multiple frame elements to make up the body of the windshield wiper assembly, the spot welding prevents easy replacement of the squeegee.

Another background art windshield wiper assembly uses two pieces of spring steel that hold a squeegee therebetween. An end cap is used to hold the two pieces of spring steel in position to hold the squeegee. Although this background art windshield wiper assembly also eliminates the necessity of having multiple frame elements, the end cap does not maintain the two pieces of spring steel sufficiently away from each other to allow for the squeegee to move longitudinally between the two pieces of spring steel. In view of this, binding of the squeegee during operation of the windshield wiper assembly occurs.

SUMMARY OF THE INVENTION

Accordingly, it is an object of the present invention to provide a windshield wiper assembly, which eliminates the above problems encountered with windshield wiper assemblies according to the background art.

The above objects are accomplished by a windshield wiper assembly, comprising:

a pair of leaf spring elements, said leaf spring elements being supported generally parallel to each other with a space therebetween;

a squeegee, said squeegee being supported within the space between the leaf spring elements;

a windshield wiper arm bracket, said windshield wiper arm bracket being fixed to an intermediate portion of said pair of spring steel elements and being connectable to a windshield wiper arm; and a support bracket, said support bracket maintaining said pair of leaf spring elements in generally parallel spaced apart relation to support said squeegee therebetween, said support bracket supporting said squeegee for longitudinal movement with respect to said pair of leaf spring elements during operation of the windshield wiper assembly to prevent binding of said squeegee.

The above objects are also accomplished by a windshield wiper assembly, comprising a pair of leaf spring elements, said leaf spring elements being supported generally parallel to each other with a space therebetween;

a squeegee, said squeegee being supported within the space between the leaf spring elements;

a windshield wiper arm bracket, said windshield wiper arm bracket being fixed to an intermediate portion of said pair of spring steel elements and being connectable to a windshield wiper arm; and a support bracket; and a removable end cap, wherein said support bracket includes a tab that extends into the space between said pair of leaf spring elements to maintain said pair of leaf spring elements in generally parallel spaced apart relation to support said squeegee therebetween, said support bracket supporting said squeegee for longitudinal movement with respect to said pair of leaf spring elements during operation of the windshield wiper assembly to prevent binding of said squeegee.

The above objects are also accomplished by a windshield wiper assembly, comprising a pair of leaf spring elements, said leaf spring elements being supported generally parallel to each other with a space therebetween;

a squeegee, said squeegee being supported within the space between the leaf spring elements;

a windshield wiper arm bracket, said windshield wiper arm bracket being fixed to an intermediate portion of said pair of spring steel elements and being connectable to a windshield wiper arm; and a support bracket; and a removable end cap, wherein said removable end cap includes a tab that extends into the space between said pair of leaf spring elements to maintain said pair of leaf spring elements in generally parallel spaced apart relation to support said squeegee therebetween, said end cap supporting said squeegee for longitudinal movement with respect to said pair of leaf spring elements during operation of the windshield wiper assembly to prevent binding of said squeegee.

Further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Referring now in detail to the accompanying drawings, the preferred embodiments of the present invention will be described. Referring to FIGS. 1-12, a first embodiment of the present invention will be described.

A windshield wiper assembly 1 includes a squeegee 3 supported between two spring steel elements 5 (leaf spring elements). A windshield wiper arm bracket 7 is mounted to the outside of the spring steel elements 5 (See FIGS. 1 and 2). The windshield wiper arm bracket 7 would include an adapter (not shown) attached thereto by a post 9, so that the windshield wiper arm bracket 7 can be removably connected to a windshield wiper arm (not shown).

Figures 1, 2, 3, 4:
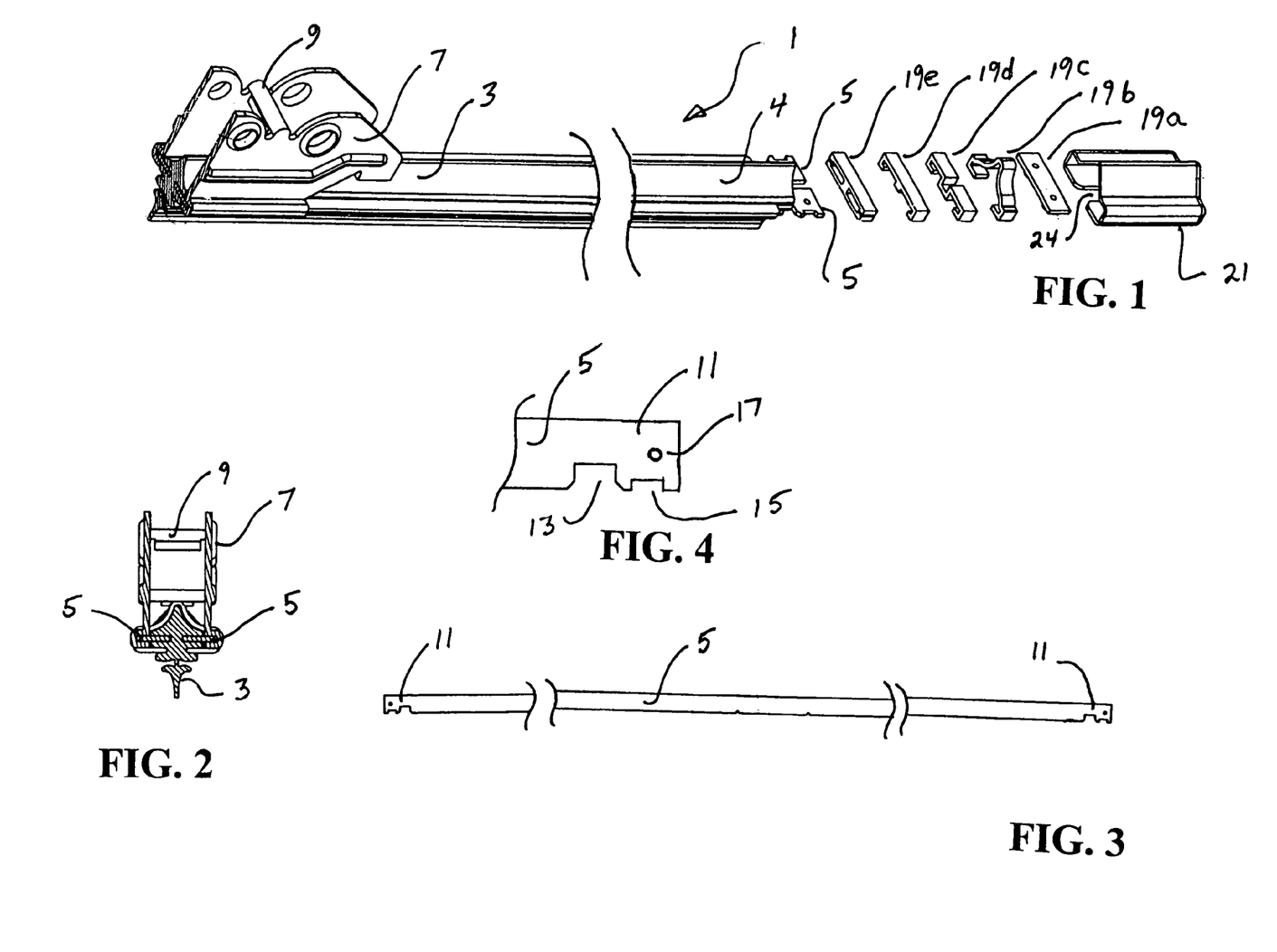
FIG. 1 is a partial perspective view of a windshield wiper assembly according to a first embodiment of the present invention.
FIG. 2 is a cross-sectional view of FIG. 1 through the windshield wiper arm bracket.
FIG. 3 is a partial top view of one of spring steel elements according to the first embodiment of the present invention.
FIG. 4 is a detail view of FIG. 3.

The spring steel elements 5 will now be further described with reference to FIGS. 3 and 4. As should be understood, two spring steel elements 5 are included in the windshield wiper assembly 1 of the present invention. However, since each of the two spring steel elements 5 is a mirror image of each other, only one will be specifically described. Referring to FIG. 3, the spring steel element 5 includes two end portions 11. Each of the end portions includes a first cut-out 13 and a second cut-out 15 (see FIG. 4). In addition, each of the end portions includes a hole 17 extending therethrough.

The spring steel elements 5 are arranged in spaced apart relationship to secure the squeegee 3 therebetween. However, it is advantageous to allow the squeegee to slide longitudinally with respect to the spring steel elements 5 during operation of the windshield wiper assembly 1. If the squeegee 3 is securely clamped between the spring steel elements 5, so that the squeegee 3 cannot slide, the squeegee will bind and therefore affect the proper operation of the windshield wiper assembly 1. In addition, the squeegee 3 should be allowed to slide with respect to the spring steel elements, so that the squeegee 3 can be replaced without difficulty.

It should be noted that the recitation "spring steel elements" is not limited to elements that are made of steel. As long as the material is functional as a leaf spring, then such material would be considered within the scope of the present invention. For example, other types of metal or plastics could also be used as the spring steel elements 5.

In order to secure the squeegee 3 between the spring steel elements 5 in the above manner, one of the brackets 19a, 19b, 19c, 19d or 19e are used. The brackets 19a-19e will be individually described below with reference to FIGS. 6-10. In addition to the brackets 19a-19e, an end cap 21 is secured to each end of the two spring steel elements 5. The end caps 21 prevent the squeegee 3 from moving longitudinally more than a predetermined amount during operation of the windshield wiper assembly 1. Removal of one of the end caps 21 will gain access to the brackets 19a-19e, which can be removed to replace the squeegee 3.

Figure 5:
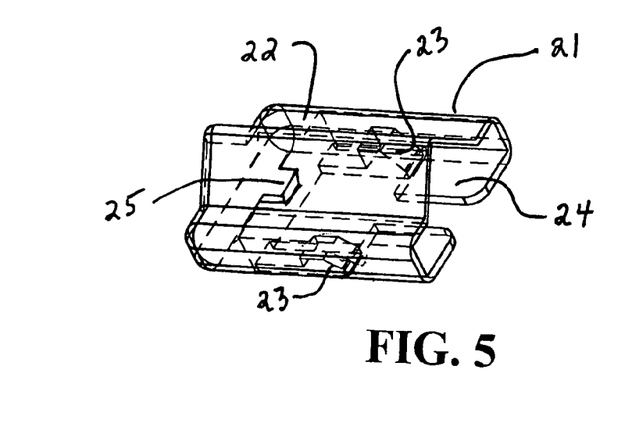
FIG. 5 is a perspective view of an embodiment of the bracket according to the first embodiment of the present invention.

Referring to FIGS. 1, 4 and 5, the operation of the end cap 21 will be described. The end cap 21 is secured over the brackets 19a-19e, the spring steel elements 5 and the squeegee 3. The end cap includes a body 22 that forms a space 24 for receiving the brackets 19a-19e, the spring steel elements 5 and the squeegee 3. The body 22 includes two detents 23 that extend into the space 24 and are received in a respective one of the first cut-outs 13 of the two spring steel elements 5. The detents are elastically deformable, so that they can be moved out of engagement with the first cut-outs 13 to remove the end cap 21 from the spring steel elements 5. However, in the relaxed state, the two detents are secured in the first cut-outs 13 to attach the end cap 21 to the spring steel elements.

Referring to FIG. 5, the end cap 21 can include a tab 25 that is received between the adjacent spring steel elements 5. The tabs are designed such that the spring steel elements are separated from each other by a predetermined distance that allows the squeegee 3 to slide longitudinally with respect to the spring steel elements 5 during operation of the windshield wiper assembly 1 to prevent binding of the squeegee 3. This structure enables proper operation of the windshield wiper assembly 1. The end cap 21 also includes a top portion 27 that is structured to correspond to the shape of the spoiler 4 formed integrally with the squeegee 3. If the squeegee 3 does not include a spoiler 4, then the end cap 21 can be constructed to have a top portion 27 that corresponds to the shape of the squeegee 3 and/or brackets 19a-19e.

Figure 6:
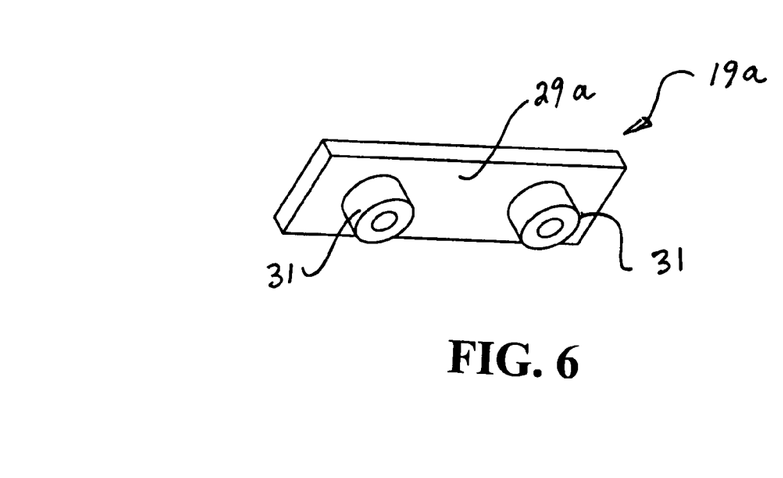
FIG. 6 is a perspective view of an embodiment of the bracket according to the first embodiment of the present invention.

Referring to FIG. 6, one embodiment of the bracket according to the present invention will be described. It should be understood that only one of the brackets 19a-19e is included in a particular windshield wiper assembly 1. It should also be understood that opposite ends of the windshield wiper assembly 1 could include different of the brackets 19a-19e attached thereto. The bracket 19a includes a body 29a having two bosses 31 extending from one surface thereof. The bosses 31 are received within the holes 17 of the two spring steel elements 5. The bosses 31 can then be connected to the spring steel elements by a removable fastener. Alternatively, the bosses 31 can be deformed like a rivet to secure the bracket 19a to the spring steel elements. The bosses 31 are designed so that the spring steel elements 5 are spaced away from each other to prevent binding of the squeegee 3 located therebetween.

The bracket 19a can be used on one end of the windshield wiper assembly 1 or on both ends of the windshield wiper assembly 1. If used on both ends; however, it is difficult to replace the squeegee 3 when necessary, if the bosses 31 are deformed as described above. In such a case, the bracket 19a should only be used on one end of the windshield wiper assembly, with the opposite end of the windshield wiper assembly utilizing one of the brackets 19a-19e, which are more easily removable.

Figure 7:
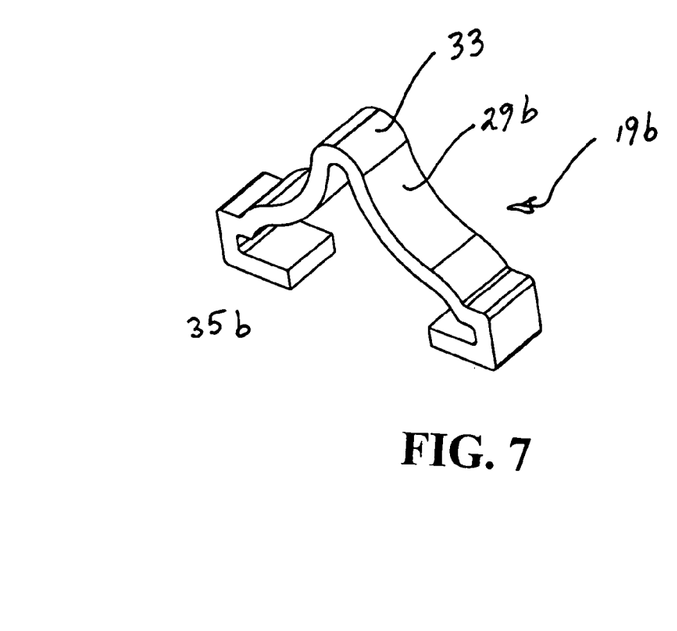
FIG. 7 is a perspective view of an embodiment of the bracket according to the first embodiment of the present invention.

Referring to FIG. 7, a bracket 19b includes a body 29b having a top portion 33 that corresponds to the shape of the spoiler 4 on the squeegee 3. The bracket 19b is typically used along with an end cap 21 that includes a tab 25 to maintain the spring steel elements 5 in a properly separated state. The resiliency of the bracket 19b also assists in maintaining the separation between the two spring steel elemements 5. The bracket 19b includes two arms 35 that are received in the second cut-outs 15 of the two spring steel elements 5. Therefore, the spring steel elements can secure the squeegee 3 therebetween, so that the squeegee 3 does not bind during operation of the windshield wiper assembly 1.

Although not required, the bracket 19b is preferably crimped to the spring steel elements 5 to permanently mount the bracket 19b to the spring steel elements 5. Crimping the bracket 19b to the spring steel elements provides the advantage of maintaining the windshield wiper assembly 1 together if the end cap 21 is accidentally removed. However, as mentioned above, the top portion 33 of the body 29b includes a shape that corresponds to the shape of the spoiler 4 on the squeegee. In view of this, even though the bracket 19b is crimped to the spring steel elements 5, the squeegee 3 can be removed by simply removing the end cap 21. In other words, the top portion 33 of the bracket 19b enables the squeegee 3 to be removed without removing the bracket 19b by sliding the squeegee 3 through the space formed by the top portion 33 of the bracket 19b and the spring steel elements 5.

Figure 8:
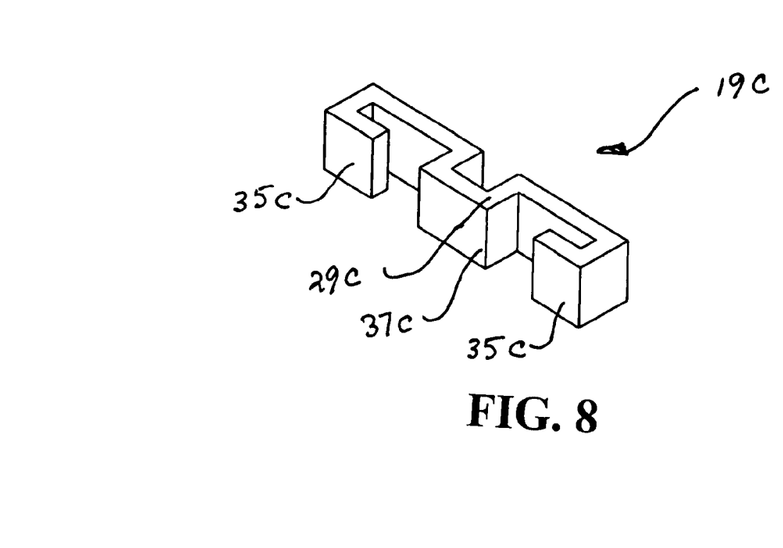
FIG. 8 is a perspective view of an embodiment of the bracket according to the first embodiment of the present invention.
Figure 9:
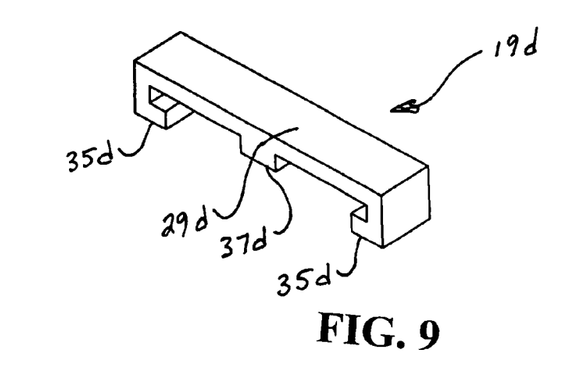
FIG. 9 is a perspective view of an embodiment of the bracket according to the first embodiment of the present invention.
Figure 10:
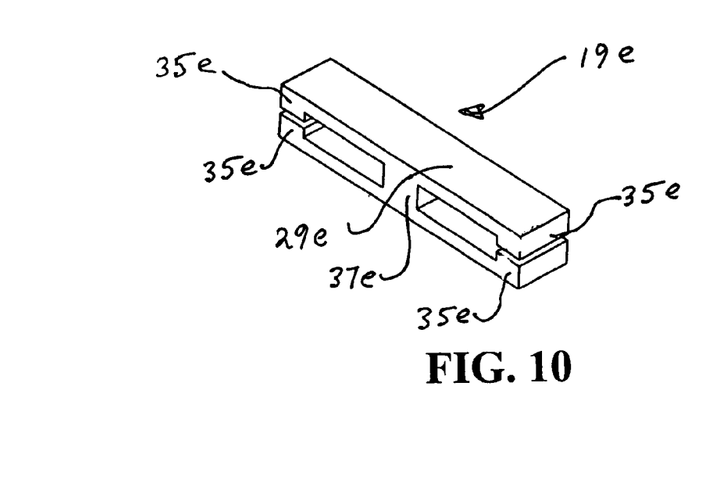
FIG. 10 is a perspective view of an embodiment of the bracket according to the first embodiment of the present invention.

Referring to FIGS. 8-10, the brackets 19c-19e will be described. Each of the brackets 19c-19e includes a body 29c, 29d and 29e, respectively. In addition, arms 35c, 35d and 35e are respectively included on the body 29c, 29d and 29e. The arms 35c-35e are received in the second cut-outs 15 formed in the two spring steel elements 5. The arms 35c-35e secure the spring steel elements 5 together with the squeegee 3 located therebetween. In addition, the brackets 19c-19e include tabs 37c, 37d and 37e, respectively. The tabs 37c-37e are received in the space between the two spring steel elements 5, so that the squeegee 3 is properly mounted therebetween.

It should be noted that the tab 37e of the bracket 19e is actually a rib, since it extends between two surfaces of the body 19e. However, the term "tab" is considered to encompass the rib of the bracket 19e.

Figure 11:
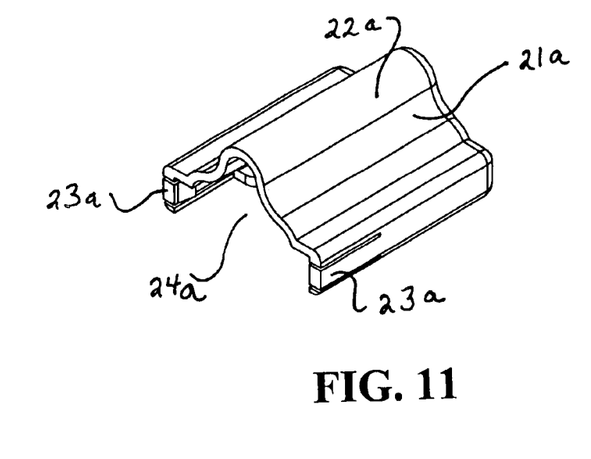
FIG. 11 is a perspective view of an embodiment of the bracket according to the first embodiment of the present invention.
Figure 12:
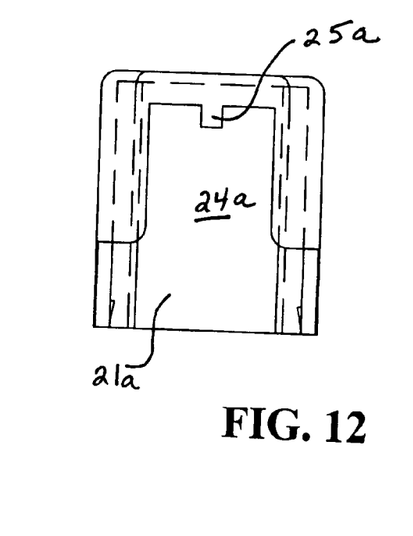
FIG. 12 is a bottom view of FIG. 11.

Referring to FIGS. 11 and 12, an alternative arrangement of the end cap 21 will be described. The end cap 21a includes a pair of detents 23a that are received in the first cut-outs 13 of the spring steel elements 5. The detents 23a are mounted to the side wall of the end cap 21a instead of a bottom wall as in the end cap 21 of the first embodiment. Therefore, the detents 23a pivot into the cut-outs 13 from a side of the spring steel elements 5, rather than from a bottom of the spring steel elements 5. In addition, the end cap 21a can include a tab 25a that extends between the two spring steel elements 5 to maintain the spring steel elements 5 in a separated state. The operation of the end cap 21a is similar to the operation of the end cap 21. Therefore, the operation of the end cap 21a will not be described further.

A second embodiment of the present invention will now be described with reference to FIGS. 13-18. In FIGS. 13-18, the same reference numerals have been used to identify the same or similar elements, except that 100 has been added to the reference numeral when the element is not identical to the corresponding element in the first embodiment. In view of this, only the differences between the first and second embodiments will be further described. It should be noted that the elements in the first embodiment can easily be substituted for the elements in the second embodiment.

Figure 13:
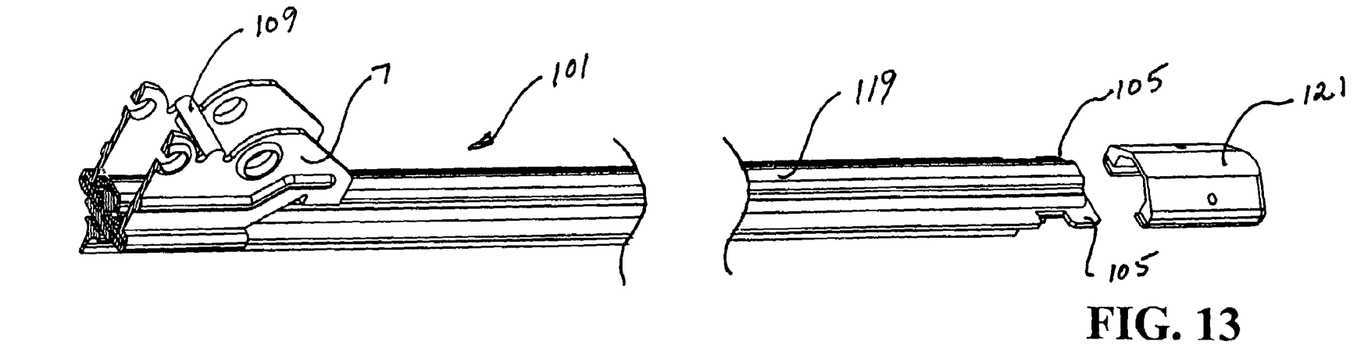
FIG. 13 is a partial perspective view of a windshield wiper assembly according to a second embodiment of the present invention.

In FIG. 13, the squeegee 103 does not include a spoiler thereon as in the first embodiment of the present invention. However, it should be understood that the second embodiment is not limited to a squeegee without a spoiler. The squeegee of the first embodiment could also be used in the second embodiment of the present invention.

Figure 14:
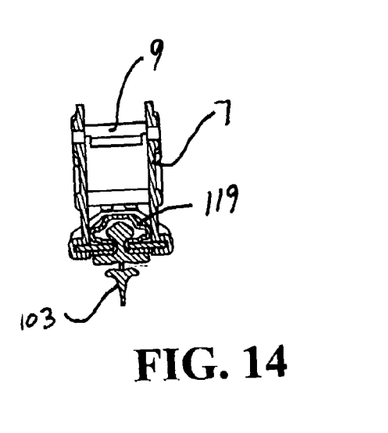
FIG. 14 is a cross-sectional view of FIG. 13 through the windshield wiper arm bracket.

Referring to FIGS. 13 and 14 of the present invention, the windshield wiper assembly 101 includes two spring steel elements 105 arranged in the same manner described in the first embodiment to support the squeegee 103 therebetween. However, instead of using one of the brackets 19a-19e to maintain the spring steel elements 105 in proper spaced relationship, a bracket 119 is used instead. The bracket 119 will be described below with reference to FIG. 18.

Figure 15:
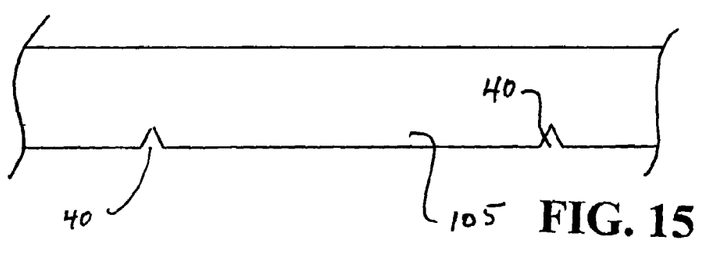
FIG. 15 is a detail view of a center portion of one of the spring steel elements according to the second embodiment of the present invention.
Figure 16:
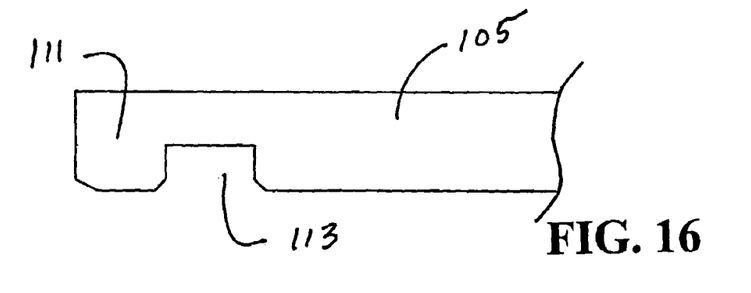
FIG. 16 is a detail view of an end portion of one of the spring steel elements according to the second embodiment of the present invention.

Referring to FIGS. 15 and 16, the spring steel elements 105 will be described. The end portions 111 of the spring steel elements are similar to the end portions 11 of the first embodiment, except that a single cut-out 113 is formed in each of the end portions 111. The cut-out 113 receives detents 123 (see FIG. 17) in the manner described above with regard to the end cap 21 of the first embodiment.

It should be noted that an end cap similar to the end cap 21a illustrated in FIG. 11 of the first embodiment (or the end cap 21) could also be used instead of the end cap 121. All that is necessary is to have a pair of detents for cooperating with the cut-outs 113 formed in the spring steel elements 105. It should also be noted that the same spring steel elements 5 of the first embodiment that include two cut-outs 13 and 15 and a hole 17 could also be used in the second embodiment. However, only one of the pair of cut-outs would be used to attach the end cap 121 (or end cap 21 or 21a) to the windshield wiper assembly 101.

Figure 17:
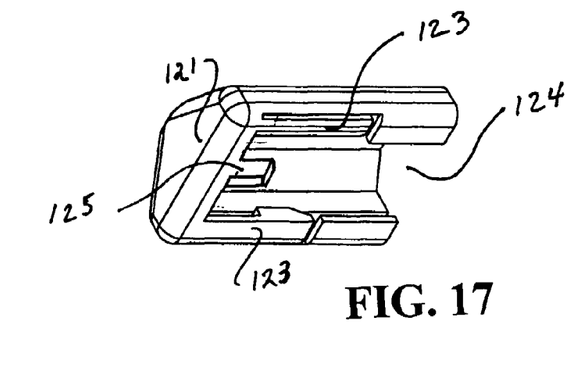
FIG. 17 is a perspective view of the end bracket according to the second embodiment of the present invention.

Referring to FIG. 17, the end cap 121 can also include a tab 125 that is received between the pair of spring steel elements 105. The tab 125 will maintain the spring steel elements 105 is spaced apart relation, so that the squeegee therebetween will not bind in operation as described above with regard to the first embodiment of the present invention. It should be noted; however, that the tab 125 is not required, since the bracket 119 may be sufficient to maintain the spacing between the two spring steel elements 105.

Figure 18:
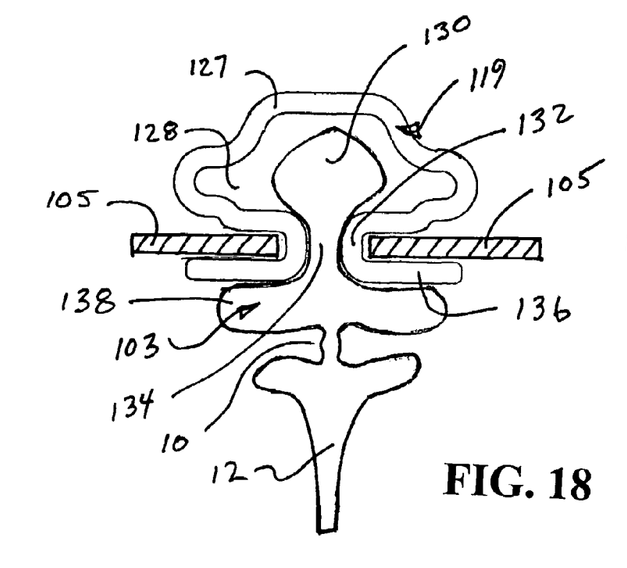
FIG. 18 is an explanatory view of the support element according to the second embodiment of the present invention.

Referring to FIG. 18, the bracket 119 will be described. FIG. 18 is an explanatory partial cross-section of the windshield wiper assembly 101 of the second embodiment. The bracket 119 includes an upper portion 127 that defines a space 128 therein. The shape of the upper portion 127 and space 128 should generally correspond to the shape of an upper portion 130 of the squeegee 103. Further to this, it should be noted that the bracket 119 can be constructed to be used with any type of squeegee, as long as the squeegee includes an upper portion that can be received within the space 128.

The bracket 119 also includes an intermediate portion 132 that receives an intermediate portion of the squeegee 103. Furthermore, the bracket 119 includes a lower portion 136 that receives a lower portion 138 of the squeegee 103. As can be understood from FIGS. 13 and 14, the bracket extends from one end of the windshield wiper assembly 101 to the other, generally along the entire length of the squeegee 103. The intermediate portion 132 is constructed so that the spacing between the spring steel elements 105 enables the squeegee 103 to longitudinally slide with respect to the spring steel elements 105 (and/or the bracket 119). In other words, the bracket is made of a rigid material, for example a rigid plastic, so that the spacing between the two spring steel elements 105 is maintained. In addition, the space between opposite sides of the intermediate portion 132 of the bracket 119 (the space formed by the intermediate portion 132 that receives the intermediate portion 134 of the squeegee 103), can be constructed to enable the squeegee to move longitudinally with respect to the bracket 119 during operation of the windshield wiper assembly 101. In addition, the squeegee 103 can be easily replaced by simply removing the end cap 121 and sliding the squeegee out of the bracket 119.

Figure 19:
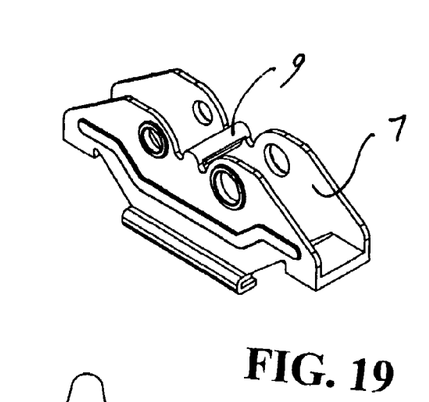
FIG. 19 is a perspective view of the windshield wiper arm bracket according to the present invention.

Referring to FIG. 19, the bracket 7 is illustrated in perspective view. The bracket 7 is mounted to the spring steel elements 5, 105 by cut-outs 40 (see FIGS. 3 and 15). The bracket 7 would include tabs (not shown) that would be received inside the cut-outs 40, to attach the bracket 7 to the spring steel elements 5, 105.

Figure 20:
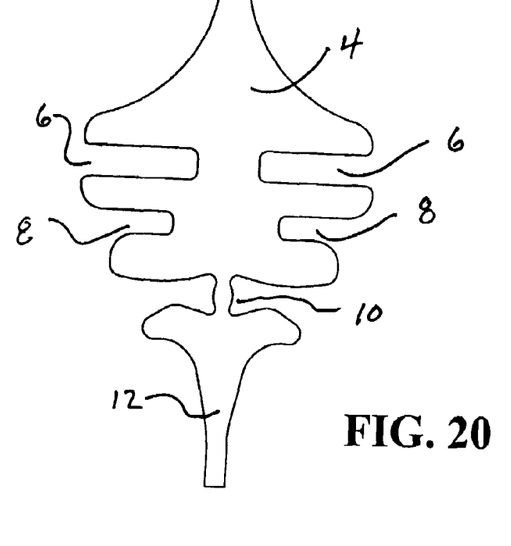
FIG. 20 is a cross-sectional detail view of a squeegee having an air spoiler formed integrally thereon.

Referring to FIG. 20, a cross-section of the squeegee 3 will be further described. The squeegee includes the spoiler 4, cut-outs 6 that receive the spring steel elements 105 and cut-outs 8 that receive the bracket 7. In addition, a hinge portion 10 supports the blade 12 to the supported portions of the squeegee 3. The hinge portion 10 can be made rounded as illustrated in FIGS. 18 and 20 to increase the performance of the blade 12 during operation of the windshield wiper assembly 1, 101.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield wiper assembly, comprising:
   a pair of leaf spring elements, said leaf spring elements being supported generally parallel to each other with a space therebetween;
   a squeegee, said squeegee being supported within the space between the leaf spring elements;
   a windshield wiper arm bracket, said windshield wiper arm bracket being fixed to an intermediate portion of said pair of spring steel elements and being connectable to a windshield wiper arm;
   a support bracket connected to one end of the pair of leaf spring elements, said support bracket maintaining said pair of leaf spring elements in generally parallel spaced apart relation to support said squeegee therebetween, said support bracket supporting said squeegee for longitudinal movement with respect to said pair of leaf spring elements during operation of the windshield wiper assembly to prevent binding of said squeegee; and
   a removable end cap located at said one end of the pair of leaf spring elements, wherein said end cap includes a tab that extends between said pair of leaf spring elements to maintain said pair of leaf spring elements in said generally parallel spaced apart relation.

2. The windshield wiper assembly according to claim 1, wherein said support bracket includes a tab, said tab extending between said pair of leaf spring elements to maintain said pair of leaf spring elements in said generally parallel spaced apart relation.

3. The windshield wiper assembly according to claim 1, wherein said pair of leaf spring elements each include first and second end portions, each of said first and second end portions including a hole formed therethrough, and said support bracket includes a pair of bosses, said pair of bosses being received in cooperating holes formed in said end portions of said pair of leaf spring elements.

4. The windshield wiper assembly according to claim 1, wherein said support bracket includes an upper portion forming a space for receiving an upper portion of the squeegee and an intermediate portion for receiving an intermediate portion of the squeegee, and said intermediate portion extends between said pair of leaf spring elements to maintain said pair of leaf spring elements in said generally parallel spaced apart relation.

5. The windshield wiper assembly according to claim 1, wherein said pair of leaf spring elements each include first and second end portions, each of said first and second end portions including at least one cut-out formed on one side thereof, and said support bracket includes a pair of arms, said pair of arms being received in cooperating cut-outs formed in said end portions of said pair of leaf spring elements.

6. The windshield wiper assembly according to claim 1, wherein said squeegee includes an integral spoiler formed on a top portion thereof.

7. The windshield wiper assembly according to claim 1, wherein said squeegee includes a hinge portion that mounts a blade of the squeegee to pivot during operation of the windshield wiper assembly, said hinge portion being formed by a narrow portion of said squeegee, said narrow portion having rounded walls.

8. The windshield wiper assembly according to claim 1, wherein said end cap includes a pair of detents, said pair of detents being received in cooperating cut outs formed in said pair of leaf spring elements.

9. The windshield wiper assembly according to claim 1, wherein said support bracket includes a tab that extends into the space between said pair of leaf spring elements to maintain said pair of leaf spring elements in generally parallel spaced apart relation to support said squeegee therebetween, said support bracket supporting said squeegee for longitudinal movement with respect to said pair of leaf spring elements during operation of the windshield wiper assembly to prevent binding of said squeegee.

10. A windshield wiper assembly, comprising:
    a pair of leaf spring elements, said leaf spring elements being supported generally parallel to each other with a space therebetween;
    a squeegee, said squeegee being supported within the space between the leaf spring elements;
    a windshield wiper arm bracket, said windshield wiper arm bracket being fixed to an intermediate portion of said pair of spring steel elements and being connectable to a windshield wiper arm;
    a support bracket connected at one end of the pair of leaf spring elements; and
    a removable end cap connected at said one end of the pair of leaf spring elements,
    wherein said end cap includes a tab that extends into the space between said pair of leaf spring elements to maintain said pair of leaf spring elements in generally parallel spaced apart relation to support said squeegee therebetween, said end cap supporting said squeegee for longitudinal movement with respect to said pair of leaf spring elements during operation of the windshield wiper assembly to prevent binding of said squeegee.

11. The windshield wiper assembly according to claim 10, wherein said support bracket includes a tab, said tab extending between said pair of leaf spring elements to maintain said pair of leaf spring elements in said generally parallel spaced apart relation.

12. The windshield wiper assembly according to claim 10, wherein said pair of leaf spring elements each include first and second end portions, each of said first and second end portions including at least one cut-out formed on one side thereof, and said support bracket includes a pair of arms, said pair of arms being received in cooperating cut-outs formed in said end portions of said pair of leaf spring elements.

13. The windshield wiper assembly according to claim 10, wherein said pair of leaf spring elements each include first and second end portions, each of said first and second end portions including a hole formed therethrough, and said support bracket includes a pair of bosses, said pair of bosses being received in cooperating holes formed in said end portions of said pair of leaf spring elements.

14. The windshield wiper assembly according to claim 10, wherein said support bracket includes an upper portion forming a space for receiving an upper portion of the squeegee and an intermediate portion for receiving an intermediate portion of the squeegee, and said intermediate portion extends between said pair of leaf spring elements to maintain said pair of leaf spring elements in said generally parallel spaced apart relation.

* * * * *